(12) United States Patent
Berg et al.

(10) Patent No.: US 6,631,277 B2
(45) Date of Patent: Oct. 7, 2003

(54) COMPENSATION FOR ANTENNA DIAGRAM OPTIMIZATION

(75) Inventors: Magnus Berg, Stockholm (SE); Håkan Eriksson, Stockholm (SE); Lars-Göran Lund, Bromma (SE); Sven Ekemark, Storvreta (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 438 days.

(21) Appl. No.: 09/796,690

(22) Filed: Mar. 2, 2001

(65) Prior Publication Data

US 2002/0123370 A1 Sep. 5, 2002

(51) Int. Cl.$^7$ .................................................. H04B 1/38
(52) U.S. Cl. ........................ 455/562; 370/347; 342/368
(58) Field of Search .............................. 455/561, 562.1, 455/440, 456.1, 517; 714/746; 370/347, 349, 335, 342, 328, 330; 342/372, 373, 374, 368

(56) References Cited

U.S. PATENT DOCUMENTS

| 6,141,335 A | * 10/2000 | Kuwahara et al. ........... 370/342 |
| 6,360,107 B1 | * 3/2002 | Lin et al. ................. 455/562.1 |
| 6,397,082 B1 | * 5/2002 | Searle ...................... 455/562.1 |
| 6,430,163 B1 | * 8/2002 | Mustajarvi .................. 370/310 |
| 6,473,036 B2 | * 10/2002 | Proctor, Jr. ................. 342/372 |

FOREIGN PATENT DOCUMENTS

| EP | 0 681 376 A2 | 11/1995 |
| EP | 1 096 696 A | 5/2001 |
| WO | 99/41918 | 8/1999 |

OTHER PUBLICATIONS

European Patent Office Search Report issued Nov. 30, 2001.

* cited by examiner

*Primary Examiner*—Marsha D. Banks-Harold
*Assistant Examiner*—Nghi Han Ly (57) ABSTRACT

In a radio network which employs adaptive antennas for transmission of data to mobiles methods and apparatus are provided for improving the reception of transmitted data. When a block is to be transmitted in a first beam of the antenna and the block contains information for the mobile in the second beam, a modulation and coding scheme is used for the transmission of the block such that the modulation and coding scheme provides greater protection to the portion of the block containing information for the mobile in the second beam. The use of greater protection for the portion of the block which includes information for the mobile in the second beam increases the probability that the mobile in the second beam can receive and correctly decode the information intended for the mobile in the second beam in the block.

14 Claims, 6 Drawing Sheets

COMPENSATION FOR ANTENNA DIAGRAM OPTIMIZATION

BACKGROUND

The present invention relates generally to packet data communication networks and, more particularly, to a method and apparatus for compensation for antenna diagram optimization when a transmitted message contains information for more than one spatially separated mobile.

The growth of commercial communication networks and, in particular, the explosive growth of cellular radiotelephone networks, have compelled network designers to search for ways to increase network capacity without reducing communication quality beyond consumer tolerance thresholds. At the same time usage of mobile communication equipment for transmission of data rather than speech has become increasingly popular by consumers. The possibility to send and receive electronic mail and to use a web browser to obtain world-wide-web access is frequently discussed as services that will be more and more used in wireless communication networks. As a response to this, communication network designers search for ways to efficiently transfer data information to and from mobile users.

There are fundamental differences between requirements for data communication and speech communication. For example, data communication can have a number of different service classes with different requirements on delay and error while speech has a constant high demand on delay and a moderate demand on error. The use of packet data protocols, which are more suitable for transmission of data than circuit switched protocols, have begun to find its way into cellular communication networks. Packet service integration in both GSM cellular networks as well as TDMA (IS-136) cellular networks is presently being standardized.

Today, GSM networks provide a circuit switched data service, which can be used to interconnect with external data networks. The circuit switched data service is used for both circuit switched as well as packet switched data communication. To make packet switched data communication more efficient, a new packet switched data service called GPRS (General Packet Radio Services) and an extension known as EGPRS have been introduced as a part of GSM. EGPRS/GPRS allows for packet switched communication, e.g., IP or virtual circuit switched communication. EGPRS/GPRS supports both connectionless protocols (e.g., IP) as well as a connection-oriented protocol (X.25). One of the advantages with a packet switched data communication protocol is that a single transmission resource can be shared between a number of users. Thus, in the case of, e.g., a GSM cellular network, a timeslot on a radio frequency carrier can be utilized by several mobile users for reception and transmission of data. The shared transmission resource is managed by the network side of the cellular network both for downlink and uplink transmissions.

In EGPRS/GPRS networks, to share transmission resources between a number of users, the network uses temporary flow identities (TFI) and uplink state flags (USF). When starting a transmission a mobile is assigned one or more timeslots in the uplink and/or downlink. In the assignment of timeslots the mobile is assigned a TFI and/or a USF. The TFI is attached to the data blocks transmitted in the downlink to indicate the destination of the particular data blocks. Accordingly, all mobiles listen to the assigned timeslots in the downlink and try to decode all blocks transmitted on the downlink. After decoding the received blocks a mobile will check the TFI for the particular block to determine if the mobile is the destination of the particular block.

Figure 1A:
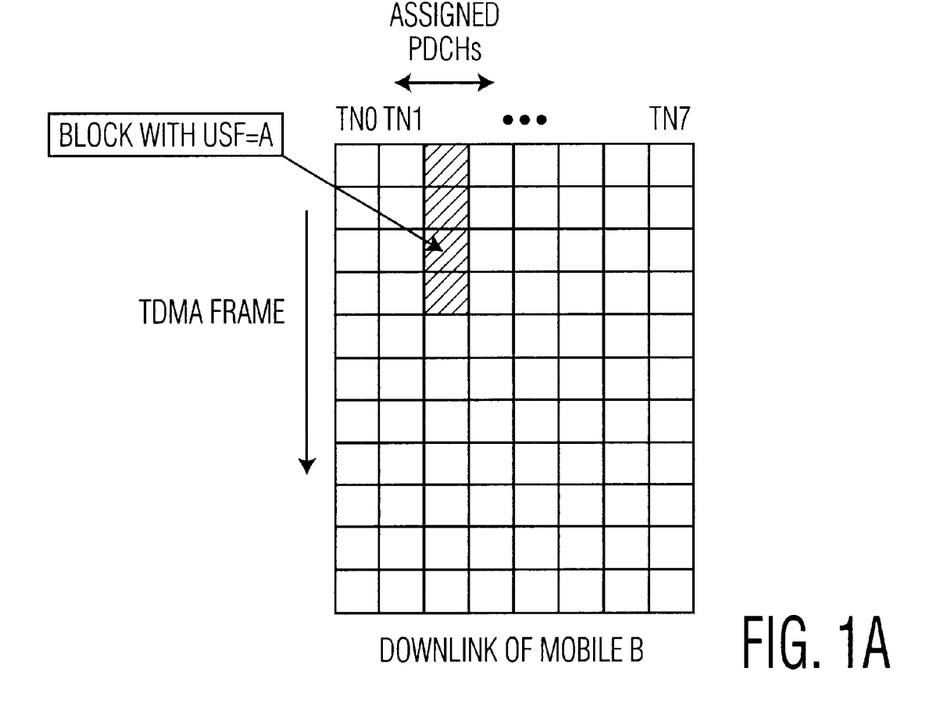
FIGS. 1A and 1B respectively illustrate uplink and downlink timeslots.
Figure 1B:
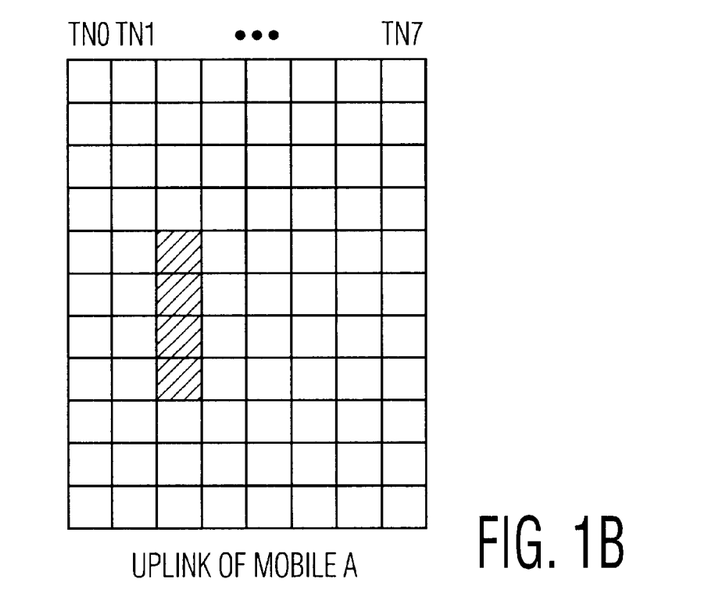

FIGS. 1A and 1B illustrate the scheduling of the uplink among a plurality of mobiles in a EGPRS/GPRS network. Assume that mobiles A and B are assigned to shared packet data channels (PDCHs) TN1 through TN3. As discussed above, each mobile will listen to the assigned timeslots to try to decode all blocks transmitted on the downlink. While attempting to decode the blocks transmitted on the downlink, the mobile will also look for an indication of whether it is allowed to transmit on the uplink. In EGPRS/GPRS the USF provides this indication. The USF indicates to a mobile that it is allowed to transmit an uplink block which corresponds to the downlink block that contains the USF. Referring again to FIG. 1A, mobile A will detect that its USF is included in the downlink radio block containing data for mobile B. Accordingly, as illustrated in FIG. 1B, mobile A transmits in the next uplink block. It will be recognized that in EGPRS/GPRS there are two modes for dynamic allocation of timeslots, granularity 1 and granularity 4. In granularity 1, a USF indicates the allocation of one uplink block (4 bursts) as illustrated in FIG. 1. With granularity 4, a USF indicates the allocation of four consecutive uplink blocks (16 bursts). Thus with granularity 4 the mobile only has to check for the USF in one quarter of the downlink blocks.

One method for reducing downlink interference is to use an adaptive antenna system. In general, an adaptive antenna system is able to adapt to its characteristics to changes in the network. One of the more important features of adaptive antenna systems is that the base station is able to detect the direction to all mobiles in the cell. The base station then adapts its radiating pattern for each mobile in order to optimize the transmission. In a switched beam system, the base station transmits information which is intended solely for the specific mobile using a narrow antenna beam which is directed to the mobile. Using a narrow antenna beam minimizes interference by not radiating a large amount of energy through an entire cell when a mobile is known to be located in a particular portion of the cell. This minimization of interference is known as antenna diagram optimization.

Figure 2:
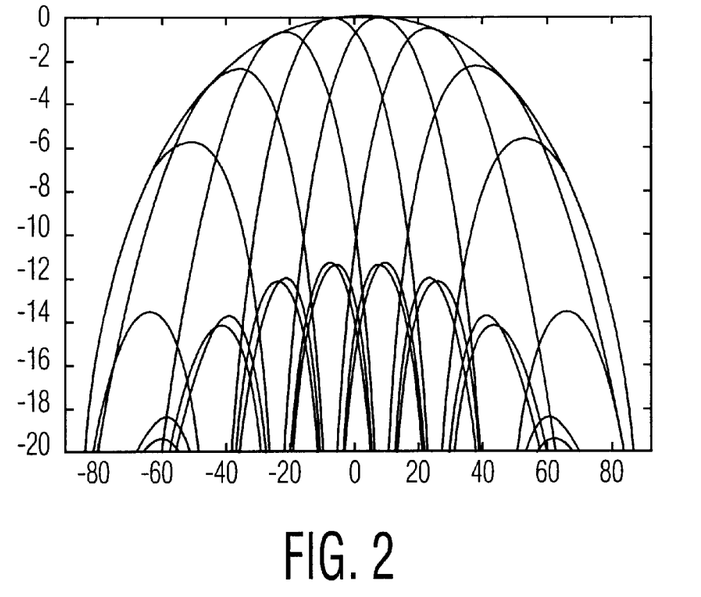
FIG. 2 illustrates beams and sectors of an antenna.

FIG. 2 illustrates an antenna diagram of the beams and the sector antenna of an exemplary adaptive antenna system. The antenna illustrated in FIG. 2 has eight fixed beams which cover smaller portions of a sector of a cell. Further, the antenna includes a sector antenna which covers the whole sector and envelopes the areas covered by the eight fixed beams. Accordingly, if information is to be transmitted to a single mobile, the mobile network selects the beam which covers the particular portion of the sector that the mobile is located in. If, however, the same information needs to be transmitted to all of the mobiles in a sector, e.g., control channel information such as a broadcast control channel (BCCH), then the sector antenna is employed. Using the individual beams to transmit to mobiles reduces the interference caused throughout the cellular network and in turn allows tighter frequency reuse and/or provides higher network capacity.

In addition to the above described advantages of adaptive antenna systems, employing adaptive antenna systems in a EGPRS/GPRS network will produce a significant throughput increase. This increase in throughput is due to the link quality control (LQC) features of EGPRS/GPRS. In EGPRS/GPRS a number of different coding schemes and two modulations are used to ensure a maximum throughput at a specific radio link quality, which may be measured in terms of a carrier-to-interference ratio (C/I). In GPRS a specific coding scheme is called CS and there exists CS1–CS4. In EGPRS a specific combination of modulation and coding is called MCS and there exists MCS1–MCS9. To implement LQC in a EGPRS/GPRS network, a mobile reports the mean and variance of the block error rate (BER) of the downlink transmission to the radio network. The radio network uses these reports to select a CS (in a GPRS network) and an MCS (in an EGRPS network) which has the best balance of radio channel throughput and a low BER.

Figure 3:
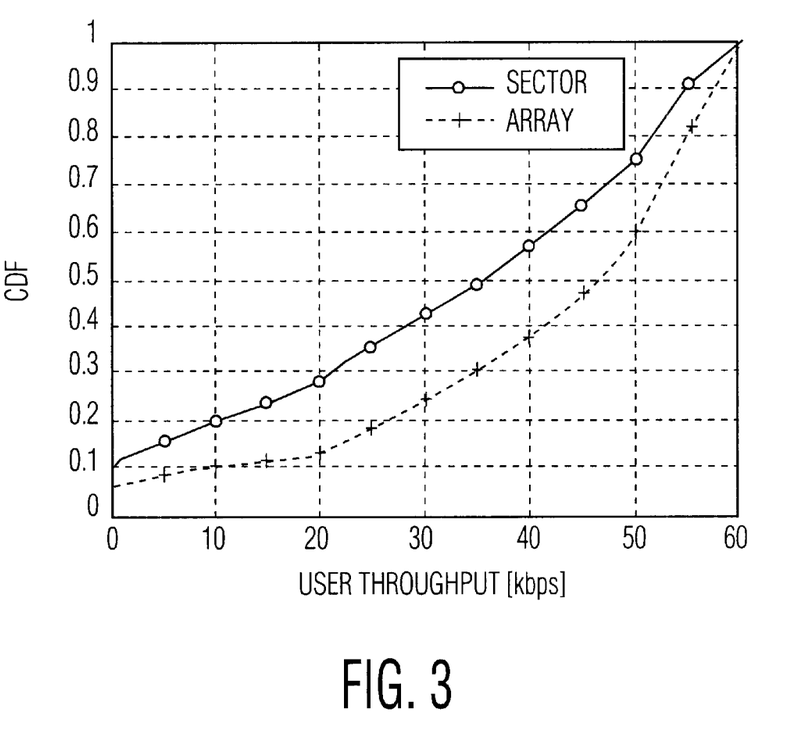
FIG. 3 illustrates the cumulative density function of the throughput for adaptive antennas and sector antennas.

FIG. 3 illustrates the carrier distribution function for throughput gain for a network with a ⅓ reuse pattern, i.e., a resuse pattern where every third cell uses the same frequencies. The curve with the circles illustrates the throughput distribution for the system deployed with sector antenna and the curve with the plus signs illustrates the throughput distribution of the system deployed with adaptive antenna. As illustrated in FIG. 3, the throughput gain for a network employing adaptive antennas is between 10 kbps and 20 kbps for every timeslot for every level on the carrier distribution function.

Figure 4:
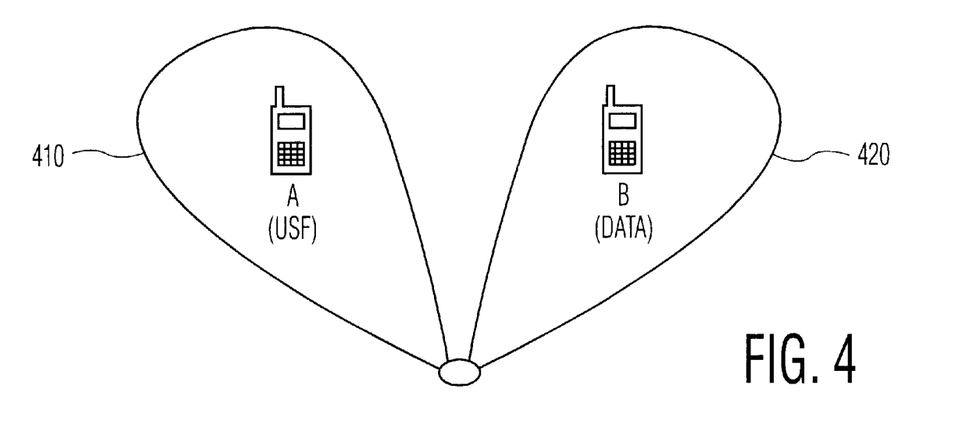
FIG. 4 illustrates the deficiencies of conventional multicast networks which employ adaptive antennas when mobiles in different antenna beams need to receive the same information.

FIG. 4 illustrates two mobiles in a EGPRS/GPRS networks which uses adaptive antennas. As illustrated in FIG. 4, mobile A is located in beam 410 and mobile B is located in beam 420. Assume now that mobile B is to receive downlink data while mobile A is to receive a USF. As described above, in EGPRS/GPRS the USF is included in a data block transmitted in a downlink timeslot. However, since the data block contains both the USF for mobile A and the data for mobile B and since mobile A and mobile B are located in different antenna beams, mobile A will not be able to receive the USF if the block is sent towards mobile B and vice versa. Although it would be desirable to transmit data in multiple beams, due to hardware limitations this may not be possible. In addition, EGPRS/GPRS networks transmit using a fixed frame structure. Accordingly, a base station has to transmit the entire block (4 bursts) in the same beam. Hence, mobile A will not be able to detect the USF in the block which also contains data intended for mobile B if the block is transmitted in beam 420. Further, if the data block containing the USF were to be transmitted in beam 410, mobile B would not be able to detect the data in the block.

Accordingly, it would be desirable to obtain the benefits of an adaptive antenna system in a radio network which operates according to EGPRS/GPRS.

SUMMARY

These and other problems, drawbacks and limitations of conventional techniques are overcome according to the present invention by a method and apparatus for transmission of data to mobiles which improves the reception of transmitted data in a radio network which uses adaptive antennas.

In accordance with one aspect of the present invention a radio network which employs adaptive antennas for transmitting data blocks determines whether information is to be transmitted to a first mobile. The radio network then determines whether the first mobile and a second mobile are located in a same antenna beam if the information is to be transmitted to the first mobile. If the first and second mobile are located in different beams and the block contains information for both mobiles the data is transmitted toward the first mobile and the data intended for the second mobile is coded so that the decreased antenna gain is eliminated. This is performed on block basis so that if granularity 4 is used the three block only containing data for one mobile will not be received by the other mobile.

BRIEF DESCRIPTION OF THE DRAWINGS

The objects and advantages of the invention will be understood by reading the following detailed description in conjunction with the drawings in which.

DETAILED DESCRIPTION

The present invention is directed to data transmission networks which implement adaptive antennas. Specifically, the present invention compensates for antenna diagram optimization to one mobile when data to be transmitted to the one mobile is mixed with data intended for other mobiles located in different antenna beams than the one mobile.

In the following description, for purposes of explanation and not limitation, specific details are set forth in order to provide a thorough understanding of the present invention. However, it will be apparent to one skilled in the art that the present invention may be practiced in other embodiments that depart from these specific details. In other instances, detailed descriptions of well-known methods, devices, and circuits are omitted so as not to obscure the description of the present invention.

Figure 5:
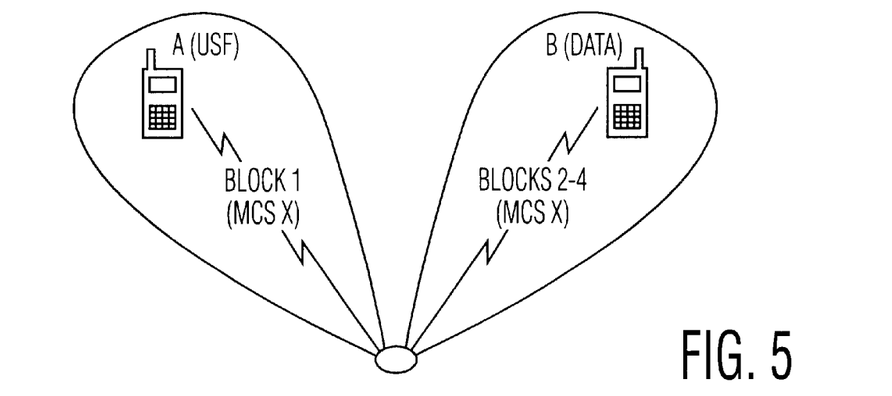
FIG. 5 illustrates data transmission using an adaptive antenna with a fixed modulation and coding scheme using the option granularity 4.

FIG. 5 illustrates one method for implementing adaptive antennas in a EGPRS/GPRS network. As illustrated in FIG. 5, granularity 4 is used and the first block, which includes the USF of mobile A, is transmitted to mobile A while the second through fourth blocks, which include data for mobile B, are transmitted to mobile B. As described above, a particular MCS for transmission is selected using reports from a mobile. When a radio channel quickly degrades, the radio network will not be able to adjust to a lower MCS because the network may not receive the report from the mobile quick enough to adjust the MCS. This results in data block transmission with too high of an MCS, i.e., an MCS which does not provide enough protection for the transmitted blocks. Since the first block is transmitted in mobile A's beam, by the time the radio network receives the report from mobile B the network has already begun to transmit the data blocks in mobile B's beam. Hence, the report from mobile B does not allow the radio network to adjust the MCS when transmitting the first block to mobile A. Accordingly, FIG. 5 illustrates transmitting all four blocks using the same MCS, i.e., MCS X.

Figure 6:
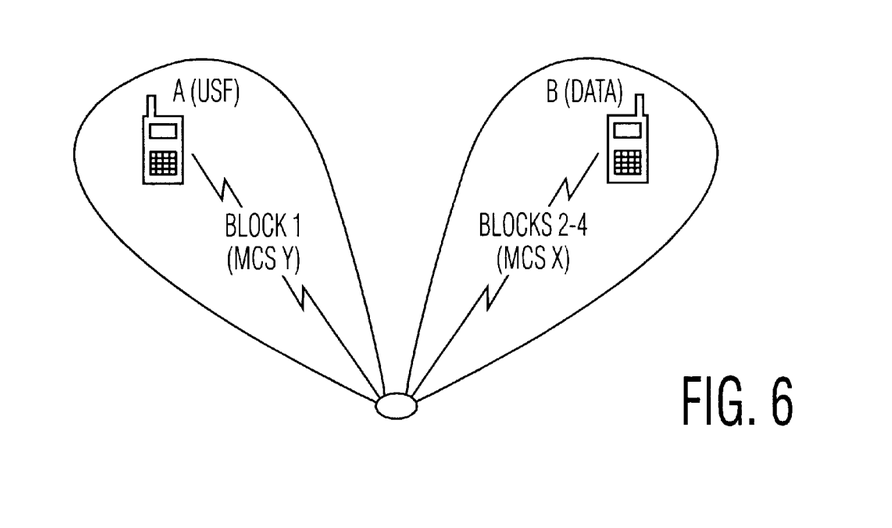
FIG. 6 illustrates an exemplary data transmission using an adaptive antenna where the information in one out of four blocks is intended for more than one mobile and the modulation and coding scheme of the data is adapted to compensate for the antenna diagram in accordance with the present invention.

FIG. 6 illustrates an exemplary method for implementing adaptive antennas in a EGPRS network in accordance with the present invention. As illustrated in FIG. 6, the radio network uses MCS Y for coding the data intended for mobile B when transmitting the first block containing USF and transmitted towards A and MCS X when transmitting the remaining blocks in the beam directed to mobile B. MCS Y will be a lower MCS than MCS X, i.e., MCS Y will have greater protection for the transmitted data but a lower throughput than MCS X. More specifically, the data in block 1 will be encoded with a more error resistant code than the USF in block 1. Then a modulation is selected for the whole data block which ensures that mobile B can receive and decode the information in block 1 that is relevant to mobile B, i.e., the whole data block except for the USF. Using a lower MCS for the block transmitted to mobile A increases the probability that mobile B can decode the data transmitted in the beam towards mobile A. It will be recognized that the radio network, based upon whether a particular radio block needs to be received by mobiles located in different beams, adjusts the MCS of the particular radio block prior to the transmission of the radio block.

Figure 7:
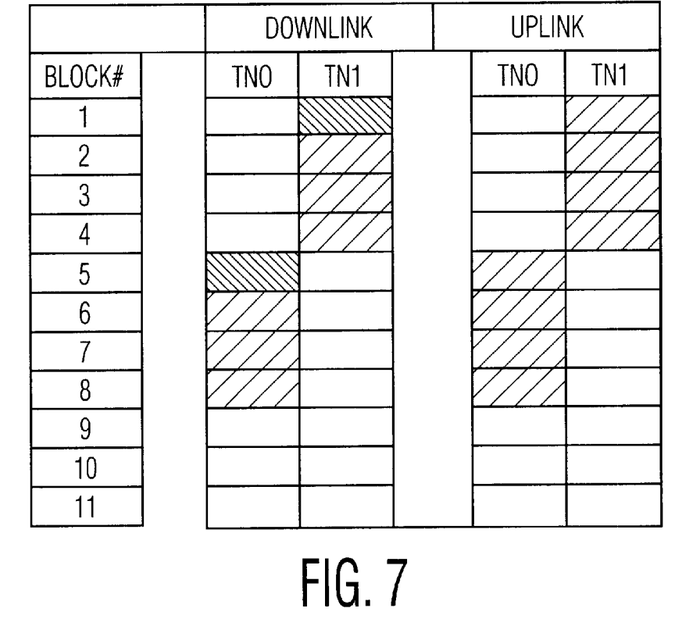
FIG. 7 illustrates exemplary uplink and downlink timeslots with different modulation and coding schemes for different blocks in the downlink in a network which employs granularity 4 in accordance with the present invention.

FIG. 7 illustrates exemplary uplink and downlink timeslots with different modulation and coding schemes for different blocks in the downlink in accordance with the present invention. As illustrated by the hash marks in FIG. 7 when a USF mobile and a DATA mobile are located in different beams and a USF is to be transmitted to the USF mobile, the first block in each timeslot (TN0 and TN1) is transmitted in the USF mobile's beam using a lower MCS than the MCS used to transmit the second through fourth blocks in the DATA mobile's beam. Again, this lower MCS is implemented so that a more error resistant coding is applied to the data portion of the block than the coding applied to the USF portion of the block.

Figure 8:
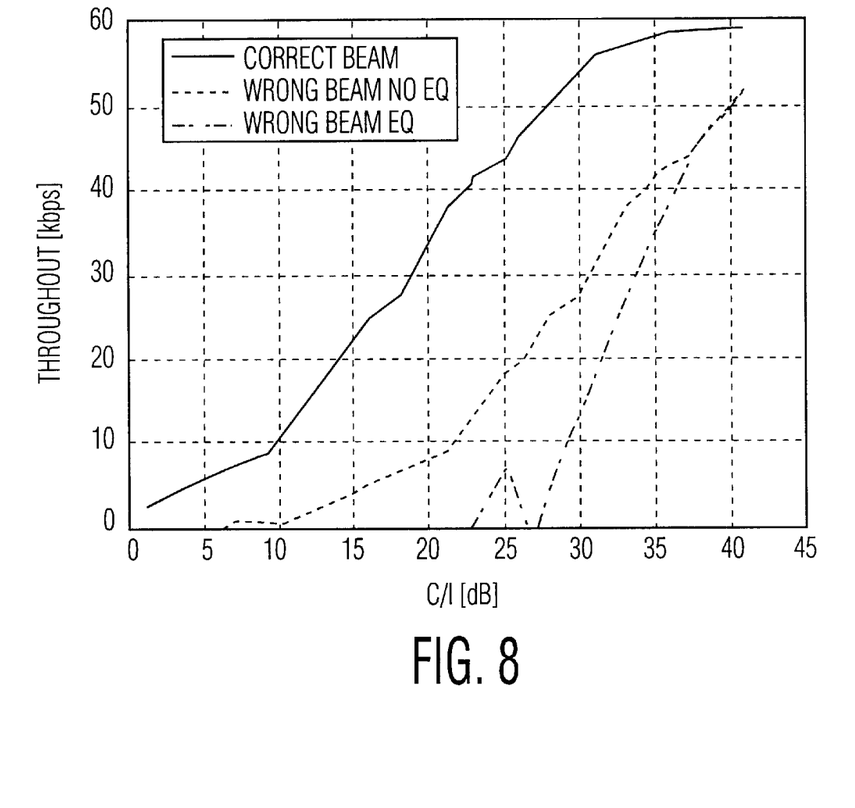
FIG. 8 illustrates the throughput for a transmitted radio block.

FIG. 8 illustrates the throughput for a transmitted radio block. The curves illustrated in FIG. 8 are based upon a carrier-to-interference ratio reduction between antenna beams of 12 db. The solid curve in FIG. 8 illustrates the throughput for a radio block transmitted in the same beam as the mobile which is intended to receive the data block. Accordingly, the mobile receives all of the data and a high throughput can be achieved. The dashed curve in FIG. 8 illustrates the throughput degradation as seen by the DATA mobile when the MCS is not adapted for transmitting a block which contains a USF and contains data intended for a mobile located in another beam when the block is transmitted in the USF mobile's beam. As can be seen, the entire transmission of the block sent to the USF mobile is lost in the reception by the DATA mobile. The dotted line illustrates the throughput degradation as seen by the DATA mobile when the MCS is adjusted for transmitting a block which contains a USF and contains data intended for a mobile located in another beam when the block is transmitted in the USF mobile's beam. As illustrated in FIG. 8, the throughput is degraded when the MCS is adjusted, but the DATA mobile should be able to decode most of the data transmitted in the beam to the USF mobile.

Figure 9:
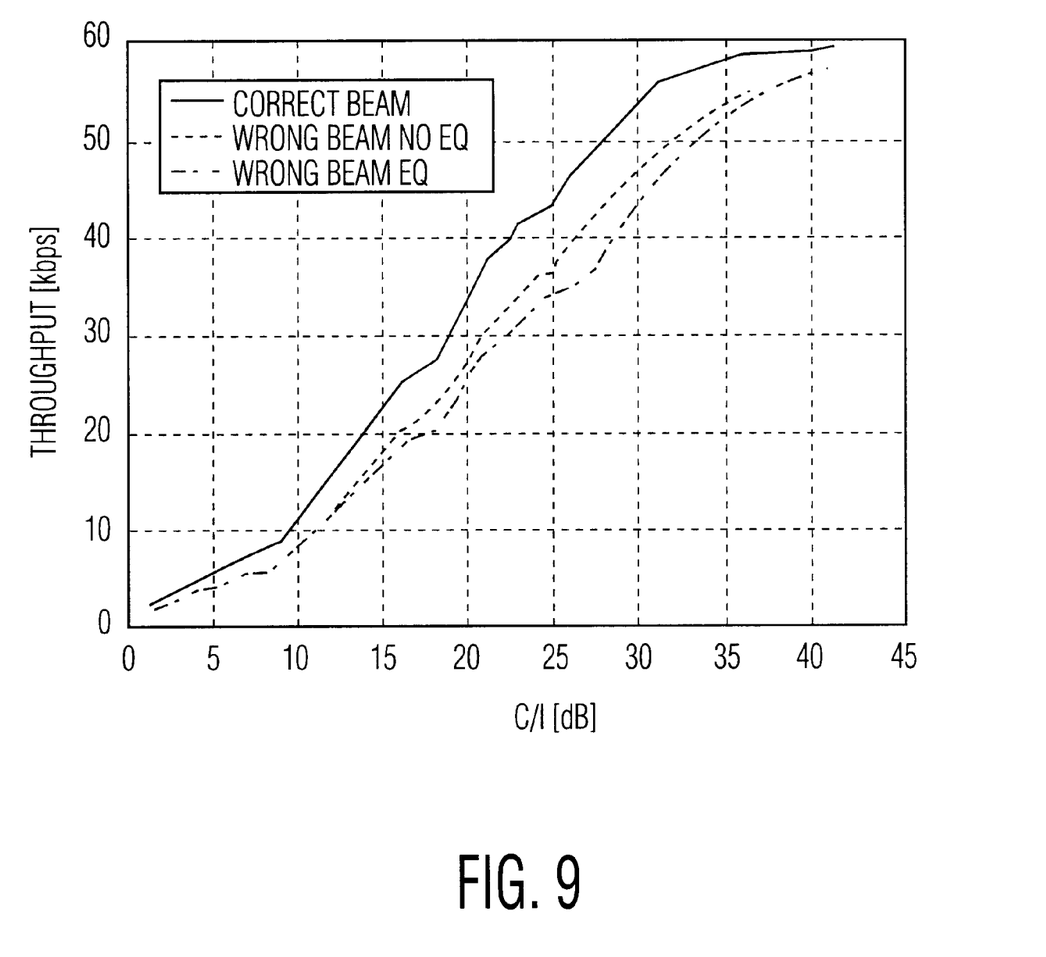
FIG. 9 illustrates the throughput averaged over four transmitted radio blocks.

FIG. 9 illustrates the throughput averaged over four transmitted blocks. The solid curve illustrates the throughput for four blocks transmitted in the same beam as the mobile which is to decode the four blocks. The dotted curve illustrates the throughput for four radio blocks when one radio block is transmitted in a different beam than the mobile which is to decode the radio block when the MCS is not adjusted. The dashed curve illustrates the throughput for four radio blocks when one radio block is transmitted in a different beam then the mobile which is to decode the radio block when the MCS is adjusted for the radio block transmitted in the different beam. As can be seen from FIG. 9, the throughput decrease averaged over the four transmitted blocks when the MCS is lowered for the first block is not significantly lower than the throughput decrease when the MCS is not adjusted. Accordingly, FIGS. 8 and 9 illustrate that adjusting the MCS for the radio block transmitted in a different beam from the DATA mobile increases the probability that the DATA mobile will be able to correctly decode the first block without significantly lowering the throughput for all four transmitted blocks.

Figure 10:
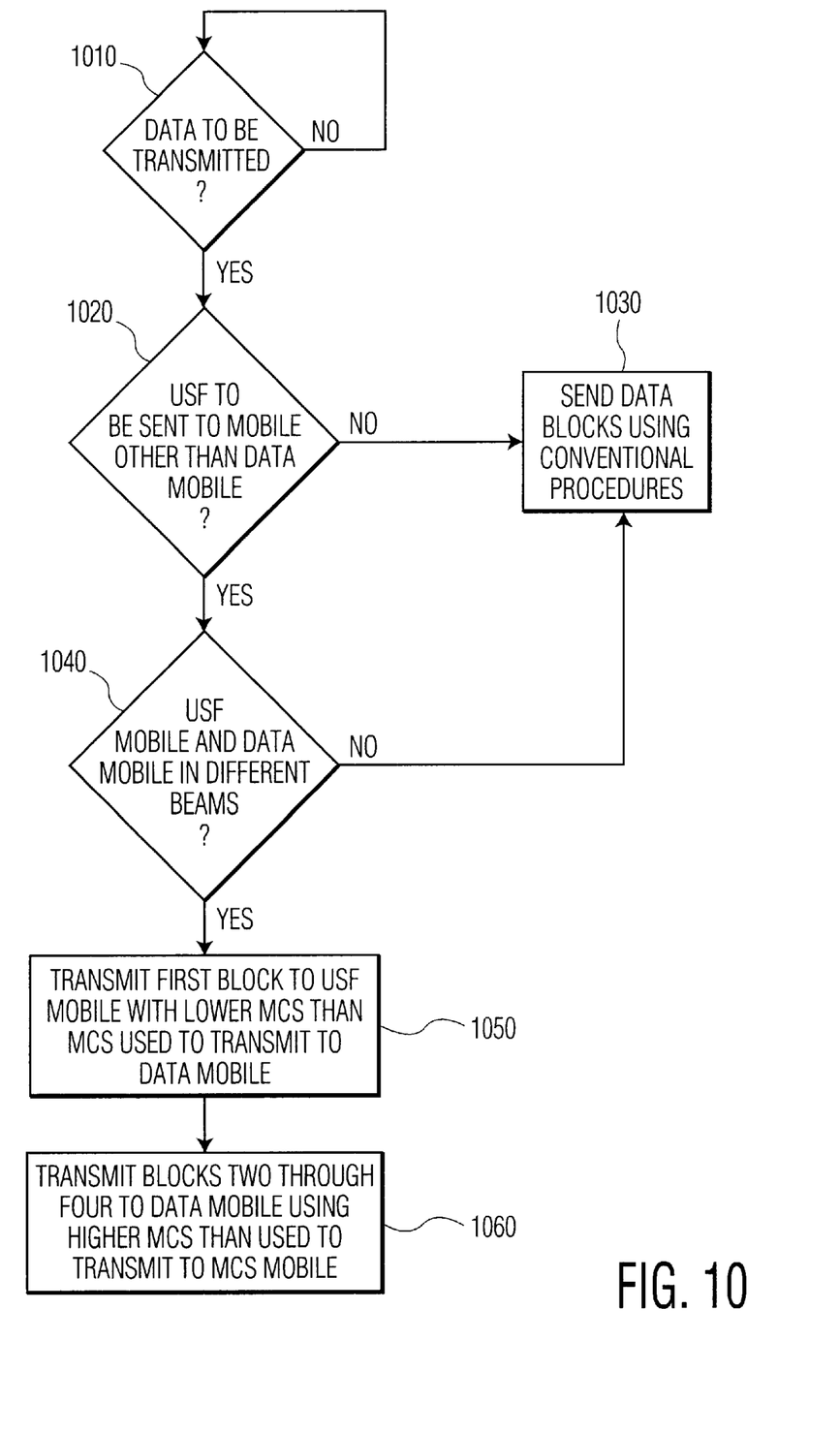
FIG. 10 illustrates an exemplary method for transmitting data blocks to mobiles in different beams in accordance with the present invention.

FIG. 10 illustrates an exemplary method in accordance with the present invention. Initially, the radio network determines whether there is data to be transmitted (Step 1010). If the radio network determines that there is no data to be transmitted ("NO" path out of decision step 1010) the radio network waits until there is data to be transmitted. If the radio network determines that there is data to be transmitted ("YES" path out of decision step 1020) the radio network determines whether a USF is to be transmitted to a mobile other than the DATA mobile (Step 1020). If it is determined that a USF is not to be transmitted to a mobile other than the DATA mobile ("NO" path out of decision step 1020), then the radio network sends the data blocks using conventional procedures, e.g., the procedures described above, (Step 1030).

If it is determined that a USF is to be transmitted to a mobile other than the DATA mobile ("YES" path out of decision step 1020), then the radio network determines if the USF mobile and the DATA mobile are located in different antenna beams (Step 1040). If the USF mobile and the DATA mobile are located in the same beam ("NO" path out of decision step 1040), then the radio network transmits the data blocks using conventional procedures, e.g., the procedures described above, (Step 1030). If, however, the USF mobile and the DATA mobile are located in different beams ("YES" path out of decision step 1040) then the radio network transmits the first block in the USF mobile's beam using a lower MCS for the data than the MCS used to transmit in the DATA mobile's beam (Step 1050). Specifically, the coding used to encode the data intended for the DATA mobile is more resistant to errors than the coding used on the USF portion of the block. The modulation for the entire block is selected to ensure that the DATA mobile can receive and decode the data in the transmitted block. Next the radio network transmits blocks two through four in the DATA mobile's beam using a higher MCS than the MCS used for the block containing the USF transmitted in the direction of the USF mobile (Step 1060).

It will be recognized that although the method described above in connection with FIG. 10 relates to a system which implements granularity 4, the present invention is equally applicable to a system which implements granularity 1. In the case of a system employing granularity 1, the method described in connection with FIG. 10 would be modified to eliminate the transmission of blocks two through four to DATA mobile (Step 1060). Further, the Step 1050 would be modified such that the data block is transmitted to the USF mobile with a lower MCS than used to transmit to the DATA mobile in the DATA mobile's own beam.

In accordance with the present invention there are various ways to determine the MCS to be used when transmitting in the USF mobile's beam. In accordance with one embodiment of the present invention a predetermined MCS can be used when transmitting blocks in the USF mobile's beam. For example, the most robust MCS in the present MCS family could be used, i.e., MCS1, can be used when transmitting blocks in the USF mobile's beam. This provides the greatest amount of protection to the blocks and provides the highest probability that the DATA mobile can decode the blocks transmitted in the USF mobile's beam.

In accordance with another embodiment of the present invention the MCS is selected based upon a fixed value of the carrier-to-interference ratio (C/I) reduction between antenna beams. This fixed value and the MCS used for transmission to the DATA mobile in the DATA mobile's antenna beam are used with a lookup table to determine the MCS to be used when transmitting in the USF mobile's antenna beam. For example, assume that MCS7 is currently used to transmit to the DATA mobile in the DATA mobile's antenna beam, and that there is a C/I degradation between antenna beams of 12 dB. Using the lookup table the network would begin at MCS7 and determine which MCS would provide enough protection to counteract the 12 dB C/I degradation between antenna beams.

In accordance with yet another embodiment of the present invention different MCS values are selected depending upon the C/I reduction between various beam combinations, i.e., based upon the C/I reduction between the USF mobile's beam and the DATA mobile's beam. In accordance with this embodiment a lookup table can be used to determine the MCS value depending upon the specific beam combination. For example, if the USF mobile is located in beam 1 and the DATA mobile is located in beam 2, a first MCS is used, and if the USF mobile is located in beam 1 and the DATA mobile is located in beam 3, a second MCS may be used.

Although the present invention has been described above as the radio network making a decision as to the particular MCS to be used when transmitting data blocks, one skilled in the art will recognize that various elements in the radio network can make this decision. For example, selection of a particular MCS can be made by the base transceiver station (BTS) from which the data blocks are to be transmitted. However, the present invention is not limited to the BTS making this decision and one skilled in the art will recognize that other components of the radio network can make this decision. Further, one skilled in the art will recognize that a BTS typically includes at least a transmitter, an antenna and a processor.

Exemplary embodiments of the present invention have been described above in connection with a GPRS/EGPRS network for purposes of illustration. Accordingly, it will be recognized that the present invention is generally applicable to any network in which adaptive antennas are used and information which is to be transmitted in one beam of the antenna needs to be received by a receiver located in another beam of the adaptive antenna. This is achieved by separately adjusting the coding of the information transmitted in a block which needs to be received by the spatially separated receivers. Generally the modulation of the block could be jointly optimized.

The present invention has been described with reference to several exemplary embodiments. However, it will be readily apparent to those skilled in the art that it is possible to embody the invention in specific forms other than those of the exemplary embodiments described above. This may be done without departing from the spirit of the invention. These exemplary embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. In a radio network which employs adaptive antennas, a method for transmitting comprising the steps of:

determining whether information is to be transmitted to a first mobile;

determining whether the first mobile and a second mobile are located in a same antenna beam if the information is to be transmitted to the first mobile; and if the first and second mobiles are located in different antenna beams and the information is to be transmitted to the first mobile, transmitting a first data block in the first mobile's antenna beam, wherein the first data block contains a first portion and a remainder portion, wherein the information to be transmitted to the first mobile is contained in the first portion, and wherein the first portion is encoded with a first code and the remainder portion is coded with a second code, the second code being a more error resistant code than the first code.

2. The method of claim 1, further comprising the step of:

modulating the first data block, wherein the modulation is selected such that the second mobile can receive and decode the remainder portion of the first data block.

3. The method of claim 1, wherein the information is an uplink state flag which indicates that the first mobile is to transmit in the next uplink time slot.

4. The method of claim 1, wherein the first code and the second code are predetermined codes.

5. The method of claim 1, wherein the second code is selected from a lookup table based upon a fixed carrier-to-interference ratio value between adjacent antenna beams of the adaptive antenna and the first code.

6. The method of claim 1, wherein the second code is selected from a lookup table based upon a carrier-to-interference ratio value between the first mobile's antenna beam and the second mobile's antenna beam and the first code.

7. The method of claim 1, wherein the second code results in a lower data throughput for the encoded data than the first code.

8. An apparatus for transmitting data over an air-interface comprising:

an adaptive antenna; and a processor, the processor including means for determining whether information is to be transmitted to a first mobile;

means for determining whether the first mobile and a second mobile are located in a same antenna beam if the information is to be transmitted to the first mobile; and means for transmitting a first data block in the first mobile's antenna beam, wherein the first data block contains a first portion and a remainder portion, wherein the information to be transmitted to the first mobile is contained in the first portion, and wherein the first portion is encoded with a first code and the remainder portion is coded with a second code, the second code being a more error resistant code than the first code.

9. The apparatus of claim 8, further comprising:
means for modulating the first data block, wherein the modulation is selected such that the second mobile can receive and decode the remainder portion of the first data block.

10. The apparatus of claim 8, wherein the information is an uplink state flag which indicates that the first mobile is to transmit in the next uplink time slot.

11. The apparatus of claim 8, wherein the first code and the second code are predetermined codes.

12. The apparatus of claim 8, wherein the processor further comprises:
means for selecting the second code from a lookup table based upon a fixed carrier-to-interference ratio value between adjacent antenna beams of the adaptive antenna and the first code.

13. The apparatus of claim 8, wherein the processor further comprises:
means for selecting the second code from a lookup table based upon a carrier-to-interference ratio value between the first mobile's antenna beam and the second mobile's antenna beam and the first code.

14. The apparatus of claim 8, wherein the second code results in a lower data throughput for the encoded data than the first code.

* * * * *